J. H. HUNTRESS.
Buckles.
No. 206,179.   Patented July 23, 1878.
Fig 1
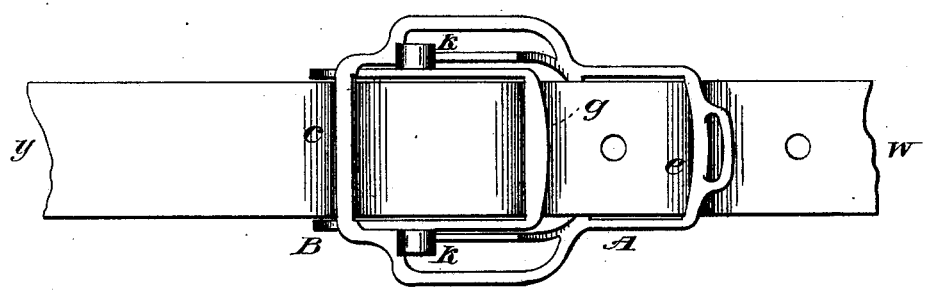
Fig 2
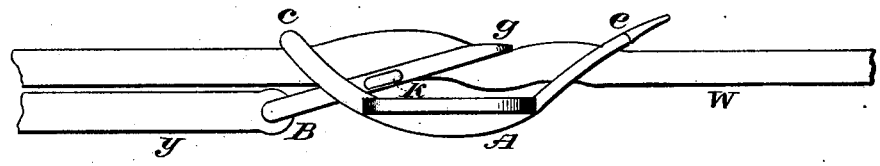
Fig 4   Fig 3
Fig 5
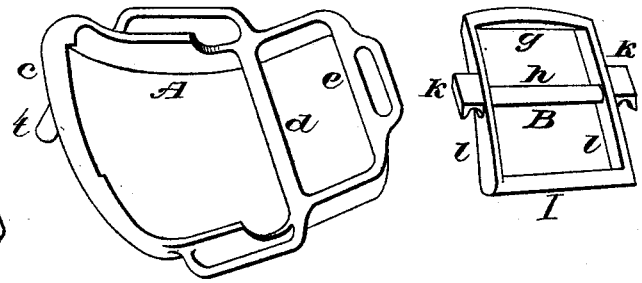
Witnesses:
Inventor:
John H Huntress

UNITED STATES PATENT OFFICE.

JOHN H. HUNTRESS, OF JANESVILLE, WISCONSIN.

IMPROVEMENT IN BUCKLES.

Specification forming part of Letters Patent No. 206,179, dated July 23, 1878; application filed May 14, 1878.

*To all whom it may concern:*

Be it known that I, JOHN H. HUNTRESS, of Janesville, Rock county, Wisconsin, have invented an Improvement in Buckles, more particularly adapted to connect the hame-tug and trace of a harness; and I do hereby declare that the following is a full and exact description thereof, reference being had to the accompanying drawings, making part of this specification.

Figure 1 is an outward view of the buckle as applied to a harness-trace and hame-tug. Fig. 2 is a side view of said buckle, with the trace and tug attached, under strain. Fig. 3 is the sliding bail of said buckle. Fig. 4 is the frame A of said buckle. Fig. 5 is a side view of the two parts of the buckle in combination.

Like letters designate corresponding parts in the different figures.

The said improvement consists of a buckle which is composed of two parts—the frame A, through which the trace passes, and the sliding bail B, attached to the tug $y$. The frame A has the usual loops for the attachment of parts of the harness, and the cross-bar $d$, located about one-fourth the distance from the rear end of said frame, and the sides of which said frame A form an irregular curve, with the ends projecting outward when applied in use, in each of which is a notch with sloping sides near and in front of the said cross-bar $d$, forming rests, into which the grooved lugs $k\,k$ of the sliding bail B drop or pass while adjusting the trace, together with the rear end bar $e$ and the forward end bar $c$, with the tongue $t$ on the inner surface thereof, projecting inwardly toward the hame-tug or horse, all of which said parts of said frame A are substantially as shown.

The sliding bail B is a simple rectangular bail with side bars $l\,l$, and the rear end bar $g$ and the forward end bar I, with the cross-bar $h$ near the middle, but in the rear thereof, with the grooved lugs $k\,k$ on the upper surface of the upper side bar $l$, and on the lower surface of the lower side bar $l$, opposite the ends of the cross-bar $h$, and which grooved lugs project therefrom, and each contains a groove on the inner surface thereof, in which the outer edge or surface of the respective sides of the frame A slide, substantially as shown.

The frame A and the sliding bail B are so made as to be adjusted and operated substantially as follows: The bail B, with the hame-tug $y$ attached to the forward end bar I, is passed through the opening between the cross-bar $d$ and the forward end bar $c$ of the frame A, from the inner side thereof, so that the grooves in the grooved lugs $k\,k$ may slide upon the outer surface of the respective side bars of the frame A, and also drop or pass into the notches or rests above described, and thereupon the trace is passed inside the rear end bar $e$ of the frame A, and outside the cross-bar $d$ of the frame A, and inside of the rear end bar $g$ of the sliding bail B, and outside the cross-bar $h$ of the bail, and inside the forward end bar $c$ of the frame A, and into one of the holes of which the tongue is placed, so that when the draft is applied to the hame-tug $y$ in one direction, and the strain to the trace $w$, fastened at the other end, in the other direction, the grooved lugs $k\,k$ are drawn forward out of the notches or rests, and along on the outer surface of the sides toward the said forward end bar $c$; and, by drawing the bail B into the line of draft, the cross-bar $h$ of the bail B gradually increases its pressure against that part of the trace $w$ coming in contact with the same in an outward direction, thus pressing the same outward, and in the rear of and against the inner surface of said end bar $c$, while at the same time the said end bar $g$ presses inward upon the trace, between the said cross-bar $d$ of the frame and the cross-bar $h$ of the bail; and by these combined pressures the trace under tension is pressed against both end bars and the cross-bar of the frame A, and the cross-bar and rear end bar of the bail B, giving pressure, and hence friction, at five distinct points, and thus almost wholly preventing strain at the hole of the trace on the tongue $t$; yet it is so arranged that, when the draft is slackened, the trace may be readily adjusted by sliding the bail B backward until the grooved lugs $k\,k$ respectively drop or pass into the notches or rests in the frame A, which relieves the trace from pressure, and allows it to readily pass either way on the outside of the cross-bars of the frame and bail, and on the inside of the end bars of the frame and the rear end bar of the bail. It may be applied to other uses besides a harness-trace buckle.

What I claim as my invention, and desire to secure by Letters Patent, is—

1. In a harness or other buckle, the main frame A, having irregular concave sides, and notches $ff$ upon their outer surfaces, and provided with cross-bar $d$ and tongue projecting from the inner surface of the end bar $e$, in combination with the sliding bail B, all substantially as shown and described.

2. In a harness or other buckle, the sliding bail B, provided with end bars $g$ and I, grooved lugs $k\ k$, and cross-bar $h$, in combination with the buckle-frame A, all constructed substantially as shown and described.

JOHN H. HUNTRESS.

Witnesses:
J. B. CASSODAY,
ED. F. CARPENTER.